United States Patent [19]

Inui et al.

[11] Patent Number: 5,665,799
[45] Date of Patent: Sep. 9, 1997

[54] RUBBER COMPOSITION AND A VULCANIZING ADHESION METHOD USING THE SAME

[75] Inventors: Naoki Inui, Nara; Hironobu Iyama, Osaka; Kyoko Tsuta, Hyogo; Hideo Nagasaki, Osaka, all of Japan

[73] Assignee: Sumitomo Chemical Company, Limited, Osaka, Japan

[21] Appl. No.: 525,267

[22] Filed: Sep. 7, 1995

[30] Foreign Application Priority Data

Sep. 7, 1994 [JP] Japan .................. 6-213854
Sep. 20, 1994 [JP] Japan .................. 6-224795

[51] Int. Cl.$^6$ .................. C08K 5/15; C08K 5/3437; C08L 9/00
[52] U.S. Cl. .................. 524/87; 524/110
[58] Field of Search .................. 524/87, 110

[56] References Cited

U.S. PATENT DOCUMENTS

| | | | |
|---|---|---|---|
| 3,083,181 | 3/1963 | Harris | 524/87 |
| 4,158,000 | 6/1979 | Nagasaki | 524/87 |
| 5,268,402 | 12/1993 | Daio et al. | 524/100 |

FOREIGN PATENT DOCUMENTS

| | | |
|---|---|---|
| A1-581618 | 2/1994 | European Pat. Off. . |
| A1 0 610 070 | 8/1994 | European Pat. Off. . |
| A1 0 672 713 | 9/1995 | European Pat. Off. . |
| 57-85835 | 5/1982 | Japan . |
| 147444 | 9/1983 | Japan . |
| 5718745 | 9/1993 | Japan . |

OTHER PUBLICATIONS

*Chem. Abs.* 122:239541 (JP–A2–06–329656).
JP–A–58–147444, Database WPI, Section Ch, Week 8341, Abstract No. 83–785855, Derwent Publications Ltd., London, GB (1983).

*Primary Examiner*—David Buttner
*Attorney, Agent, or Firm*—Cushman Darby & Cushman IP Group of Pillsbury Madison & Sutro, LLP

[57] ABSTRACT

A rubber composition (1) which comprises:
  a rubber (A) such as natural rubber, isoprene rubber and the like;
  a hydroxy flavan compound (B1) represented by the formula (I):

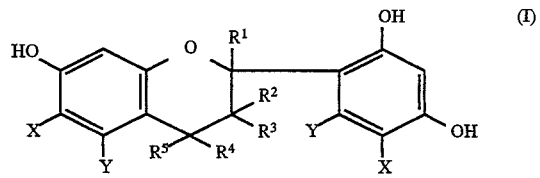

wherein $R^1$, $R^2$, $R^3$, $R^4$ and $R^5$ are hydrogen or an aliphatic group and X and Y are hydrogen hydroxy or an aliphatic group, such as 2,4,4-trimethyl-2',4',7-trihydroxyflavan (B2); and 2,2,4-trimethyl-1,2-dihydroquinoline polymer (C1) containing 1% or less by weight of a primary amine, 3% or less by weight of the monomer and 30% or more by weight of the dimer based on the total weight of the polymer, or a cromane compound (C2) which may be a novel cromane compound.

13 Claims, No Drawings

RUBBER COMPOSITION AND A VULCANIZING ADHESION METHOD USING THE SAME

The present invention relates to rubber composition which is usable for production industrial rubber products such as tires, conveyed belts and hoses. Particularly, it relates to a rubber composition which is tough and excellent in adhesive strength (=adhesiveness) to a reinforcing material, e.g. a cord, that is, to a rubbed composition preferable for coating a reinforcing material, e.g. a cord. The present invention also relates to a tire produced from the rubbed composition and a vulcanizing adhesion method between the rubbed composition and a reinforcing material, e.g. a cord. The present invention further relates to an additive usable for producing the rubber composition and a novel compound used as an ingredient of the additive.

Industrial rubber products, such as tires, belts and hoses, are often reinforced with a reinforcing material such as a steel cord or an organic fiber cord made from, for example, polyester, nylon, rayon or the like. In rubber products to be reinforced with such a reinforcing material, good adhesion between the rubber and the reinforcing material are required. Thus, hitherto, then a steel cord is used as the reinforcing material, a method of brass plating or zinc plating the surface of the steel cord has been widely adopted. In order to improve adhesion between a coating rubber and a reinforcing material, there have been known a method of compounding an organic cobalt salt such as cobalt naphthenate and/or an adhesive such as resorcin or a resorcin resin to the coating rubber. When an organic fiber cord is used as the reinforcing material, in order to improve adhesion between a coating rubber and the reinforcing material, there have been known a method of pre-treating the organic fiber with an adhesive such as resorcin or a resorcin resin and a method of compounding such an adhesive to the coating rubber during the step of processing the rubber.

Among them, a method of compounding an adhesive during the step of processing the rubber has been widely adopted because the method gives excellent initial adhesion between a rubber and a reinforcing material.

This method is called a dry bonding and generally comprises incorporating a methylene acceptor and a methylene donor which releases formaldehyde upon heating into a rubber in the step of curing to obtain an unvulcanized rubber and then adhering the unvulcanized rubber to a reinforcing material during the vulcanization step. As the methylene acceptor used for the dry bonding, there have been proposed m-substituted phenol such as resorcin or m-aminophenol, a condensation product of m-substituted phenol and an aldehyde such as formaldehyde or acetaldehyde, and a condensation product of m-substituted phenol, another mono-substituted phenol and an aldehyde.

Among them, a method in which m-substituted phenol, particularly resorcin, is used has been widely adopted since it is also effective to enhance hardness of the rubber, to improve dynamic modulus of elasticity of the rubber, to toughen the rubber, to reduce loss factor of the rubber during dynamic transformations and to reduce the heat built-up. However, the method using resorcin causes significant problems because sublimation and evaporation of resorcin during processing of the rubber, e.g. during kneading and sheeting, is harmful to the environment and to human health. Furthermore, in an unvulcanized rubber containing resorcin, resorcin tends to bloom to the rubber surface and adhesion between unvulcanized rubbers is lowered.

In JP-A-58-147444, there is described a rubber composition containing 2,4,4-trimethyl-2',4',7-trihydroxyflavan and a compound capable of donating a methylene group upon heating. However, the rubber composition is not necessarily sufficient in adhesiveness with a reinforcing material after vulcanization. In addition, the vulcanized rubber produced from the rubber composition is not necessarily sufficient in hardness, dynamic modulus of elasticity, loss factor, heat aging resistance and flex cracking resistance. Particularly, it is insufficient in durability. That is, its adhesiveness after degradation such as heat-degradation and humid-heat-degradation is not sufficient.

In order to improve heat aging resistance, flex cracking resistance and adhesiveness after degradation, various kinds of antidegradant have been used in rubber. As examples of the antidegradant, N-isopropyl-N'-phenyl-p-diaminobenzene, N-(1,3-dimethylbutyl)-N'-phenyl-p-diaminobenzene, N,N'-diphenyl-p-diaminobenzene, N,N'-ditolyl-p-diaminobenzene, a condensation product of acetone and diphenylamine and 2,2,4-trimethyl-1,2-dihydroquinoline polymer have been known.

However, the method of compounding a conventional antidegradant with rubber lowers toughness of rubber, i.e. hardness and dynamic modulus of elasticity, and increase loss factor during dynamic transformations and heat built-up of the rubber. When rubber is subjected to a vulcanization adhesion with a reinforcing material, it also has drawbacks that not only initial adhesiveness is insufficient but also heat aging resistance, flex cracking resistance and adhesiveness after degradation are still insufficient. In addition, during the processing of an unvulcanized rubber, scorching often occurs and, due to an increase in Mooney viscosity, its processability is lowered.

The inventors of present invention have conducted studies to solve the above-mentioned problems of conventional methods and, as a result, the present invention has been accomplished.

An object of the present invention is to provide a rubber composition which contains a methylene acceptor having little fuming and which exhibits improved adhesiveness with a reinforcing material, and to provide the rubber composition which further exhibits lowered degradation of the adhesiveness.

Another object of the present invention is to provide a rubber composition which gives a vulcanized rubber having improved toughness, i.e. hardness and dynamic modulus of elasticity and lowered loss factor during dynamic transformations, and to provide the rubber composition which further exhibits good processability when it is unvulcanized and which gives a vulcanized rubber further having good heat aging resistance, flex cracking resistance and heat built-up.

Further object of the present invention is to provide a vulcanization adhesion method using the rubber composition with a reinforcing material.

Still further object of the present invention is to provide a tire made from the rubber composition.

Still further object of the present invention is to provide an additive usable for producing the rubber composition and to provide a novel compound used as an ingredient of the additive.

The present invention provides a rubber composition (1) which comprises
  100 parts by weight of a rubber (A) selected from natural rubber, styrene-butadiene copolymer rubber, butadiene rubber, isoprene rubber, acrylonitrile-butadiene copolymer rubber, chloroprene rubber, butyl rubber and halogenated butyl rubber;
  0.5 part or more by weight of a hydroxy flavan compound (B1) represented by the formula (I):

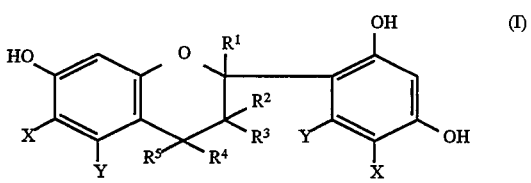

wherein $R^1$, $R^2$, $R^3$, $R^4$ and $R^5$, which may be the same or different, each represent hydrogen or an aliphatic group having 1–6 carbon atoms, or $R^1$ and $R^2$ together with the carbon atoms to which they are attached form an alicyclic ring having 4–10 carbon atoms, or $R^4$ and $R^5$ together with the carbon atom to which they are attached form an alicyclic ring having 4–10 carbon atoms, and X and Y, which may be the same or different, each represent hydrogen, hydroxy or an aliphatic group having 1–8 carbon atoms; and 0.5–5 parts by weight of a 2,2,4-trimethyl-1,2-dihydroquinoline polymer (C1) comprising 1% or less by weight of a primary amine, 3% or less by weight of the monomer and 30% or more by weight of the dimer based on the total weight of the polymer.

The present invention also provides a rubber composition (2) which comprises 100 parts by weight of above-mentioned rubber (A);

0.5 part or more by weight of 2,4,4-trimethyl-2',4',7-trihydroxyflavan (B2); and 0.005 part or more by weight of a cromane compound (C2) selected from a compound represented by the following formula (II):

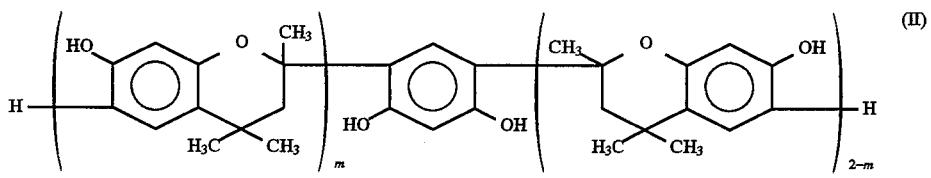

wherein m is 0 or 1, a compound represented by the following formula (III):

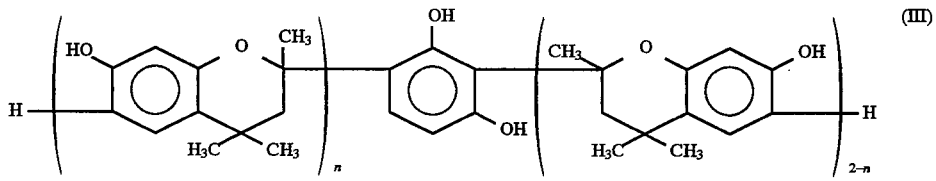

wherein n is 0, 1 or 2, and 7,7'-dihydroxy-4,4,4',4'-tetramethyl-2,2'-spirobicromane.

The present invention further provides a vulcanization adhesion method which comprises compounding (B1) and (C1) to a rubber (A) or compounding (B2) and (C2) to a rubber (A) and vulcanizing the resulting rubber composition while contacting it with a reinforcing material.

The present invention further provides a tire made from the rubber composition (1) or (2).

The present invention still further provides an additive usable for producing the rubber composition (2) which comprises (B2) and (C2) as active ingredients.

The present invention still further provides a novel cromane compound represented by the formula (II) or (III).

Rubbers (A) used in the present invention are selected from natural rubber, styrene-butadiene copolymer rubber, butadiene rubber, isoprene rubber, acrylonitrile-butadiene copolymer rubber, chloroprene rubber, butyl rubber and halogenated butyl rubber. They may be used singly or in combination of two or more. Among them, when being used for coating a steel cord, isoprene rubber and natural rubber are preferred.

Hydroxy flavan compound (B) is represented by the formula (I). In the formula (I), $R^1$, $R^2$, $R^3$, $R^4$ and $R^5$, which may be the same or different, each represent hydrogen or an aliphatic group having 1–6 carbon atoms, or $R^1$ and $R^2$ together with the carbon atoms to which they are attached form an alicyclic ring (=a half part of a condensation ring) having 4–10 carbon atoms, or $R^4$ and $R^5$ together with the carbon atom to which they are attached form an alicyclic ring (=a half part of a spiro ring) having 4–10 carbon atoms. The aliphatic group represented by $R^1$, $R^2$, $R^3$, $R^4$ or $R^5$ is usually an alkyl group. When $R^1$ and $R^2$ form a half part of a condensation ring or when $R^4$ and $R^5$ form a half part of a spiro ring, the half part of the ring thus formed may be, for example, a cycloalkane ring having about 4–8 carbon atoms and, most usually, it is a cyclohexane ring. X and Y, which may be the same or different, each represent a hydrogen atom, a hydroxy group or an aliphatic group having 1–8 carbon atoms, and preferably X and Y are hydrogen. The aliphatic group represented by X or Y is usually an alkyl group.

The hydroxy flavan compound (B1) of the formula (I), including (B2), can be produced according to a known method described, for example, in JP-A-55-139375 or JP-A-61-27980. For example, it can be produced by conducting a condensation reaction of resorcin or 4- and/or 5-substituted resorcin with ketone, α,β-unsaturated ketone, β-hydroxyketone, α,β-unsaturated aldehyde or β-hydroxyaldehyde in the presence of an acid catalyst with an inert solvent.

Examples of the hydroxy flavan compounds (B1) which are preferably used in the present invention include:
2',4',7-trihydroxyflavan,
2,4,4-trimethyl-2',4',7-trihydroxyflavan,
4-ethyl-2,3,4-trimethyl-2',4',7-trihydroxyflavan,
2,4-diethyl-4-methyl-2',4',7-trihydroxyflavan,
2,4,4-triethyl-3-methyl-2',4',7-trihydroxyflavan,
2,4-dimethyl-3-isopropyl-4-isobutyl-2',4',7-trihydroxyflavan,
6-hydroxy-4a-(2,4-dihydroxyphenyl)-1,2,3,4,4a,9a-hexahydroxanthene-9-spiro-1'-cyclohexane [i.e. a compound of the formula (I) in which X=Y=$R^3$=H, $R^1$ and $R^2$ form tetramethylene in combination and $R^4$ and $R^5$ form pentamethylene in combination], 2,4,4,5,6'-pentamethyl-2',4',7-trihydroxyflavan,
2,4,4-trimethyl-2',4',5',6,7-pentahydroxyflavan,
2,4,4-trimethyl-2',4',5,6',7-pentahydroxyflavan,
2,4,4-trimethyl-5',6-di-tert-butyl-2',4',7-trihydroxyflavan.

Among the hydroxy flavan compounds (B1), those wherein X and Y, respectively, are hydrogen are preferably used from the view of rubber properties. Particularly, 2,4,4-trimethyl-2',4',7-trihydroxyflavan, which is (B2) and which can, for example, be obtained by a condensation of resorcin with acetone, mesityl oxide or diacetone alcohol in the presence of an acid catalyst with an inert solvent, is preferred considering the availability of the raw materials 2,4,4-Trimethyl-2',4',7-trihydroxyflavan is represented by the following formula:

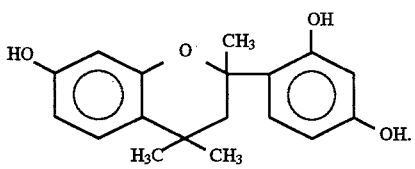

Any of the flavan compounds of the formula (I) is free from the fuming problems during rubber processing step which is a problem when resorcin is used instead.

The amount of the hydroxy flavan compound (B1) or (B2) to be compounded in the rubber composition (1) or (2) respectively is in a range of 0.5–10 parts by weight per 100 parts by weight of the rubber (A). (Hereinafter, the amount of the ingredient to be compounded is represented with a unit "phr" which means "part by weight" per 100 parts by weight of the rubber.) When the amount of the flavan compound (B1) or (B2) is less than 0.5 phr, sufficient improving effects cannot be obtained, but even if it exceeds 10 phr, no more increase of the effects accompanied with the increase of amount cannot be expected, and, hence, it is economically disadvantageous. Preferably, the amount is in a range of 0.5–3 phr.

2,2,4-Trimethyl-1,2-dihydroquinoline polymer (C1) contains 1% by weight or less of a primary amine, 3% by weight or less of the monomer and 30% by weight or more of the dimer based on total amount of the polymer. The primary amine in 2,2,4-trimethyl-1,2-dihydroquinoline polymer lowers initial adhesion and adhesiveness after heat-degradation between rubber and a reinforcing material, and it easily makes some ingredients bloom to rubber surface in an unvulcanized rubber and the blooming also lowers adhesiveness between rubber and a reinforcing material. Hence, the content of the primary amine in 2,2,4-trimethyl-1,2-dihydroquinoline polymer needs to be 1% by weight or less based on total amount of the polymer. 2,2,4-Trimethyl-1,2-dihydroquinoline monomer can easily evaporate under heat-degradating condition and easily escape in vapor from rubber surface. Hence, in order to maintain heat aging resistance, flex-cracking resistance and the like for long period, lower monomer content is preferred and the content needs to be 3% by weight or less, preferably 1% by weight or less, based on total amount of the polymer. In order to improve heat aging resistance and flex-cracking resistance, larger dimer content is preferred and the content needs to be 30% by weight or more, preferably 35% by weight or more, based on total amount of the polymer.

2,2,4-Trimethyl-1,2-dihydroquinoline polymer (C1) is usually produced by reacting aniline with acetone, diacetone alcohol or mesityl oxide upon heating in the presence of an acid catalyst. Usually, main component of 2,2,4-trimethyl-1,2-dihydroquinoline polymer is a compound represented by the following formula (IV):

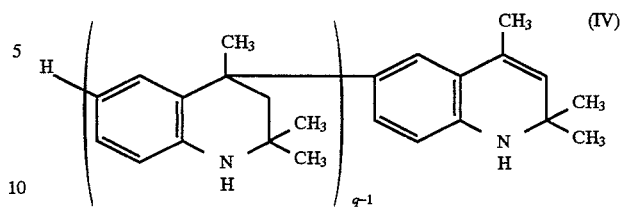

wherein q is an integer of 1 or larger, and, in this specification, "monomer" of 2,2,4-trimethyl-1,2-dihydroquinoline means a compound of formula (IV) wherein q is 1 and "dimer", "trimer" or "tetramer" means a compound of formula (IV) wherein q is 2, 3 or 4, respectively.

Various kinds of primary amines can be mentioned as examples of those contained in the 2,2,4-trimethyl-1,2-dihydroquinoline polymer. As its typical examples, those represented by the following formula can be mentioned.

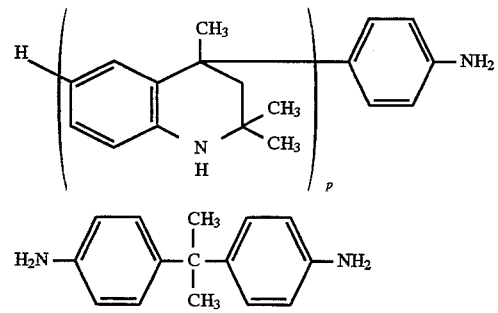

wherein p is an integer of 1 or larger.

Using in the present invention, 2,2,4-trimethyl-1,2-dihydroquinoline polymers on the market must be carefully selected, because some of those on the market do not satisfy the conditions of present invention concerning to the content of a primary amine, monomer or dimer.

Following method is a preferred example of method for producing 2,2,4-trimethyl-1,2-dihydroquinoline polymers usable in the present invention.

At first, aniline is allowed to react with acetone, diacetone alcohol or mesityl oxide upon heating in the presence of an acid catalyst such as hydrochloric acid, hydrobromic acid, hydrofluoric acid, iodide, an organic sulfonic acid or boron trifluoride, or a mixture thereof. The reaction product is purified by a distillation to obtain 2,2,4-trimethyl-1,2-dihydroquinoline monomer. Higher purity of the monomer is preferred. Usually, purity of monomer is preferably 85% by weight or more and 90% by weight or more is more preferred.

The purified 2,2,4-trimethyl-1,2-dihydroquinoline monomer thus obtained further reacts upon heating in the presence of an acid catalyst such as mentioned above to obtain a polymer mixture and from the polymer mixture, unreacted monomer is removed. When hydrochloric acid is used as an acid catalyst, the concentration of the hydrochloric acid in water is preferably in a range of 15–25% by weight, and the amount of the hydrochloric acid is in a range of 0.2–0.5 mole ratio of total of 2,2,4-trimethyl-1,2-dihydroquinoline monomer and other amine compounds contained in it as impurities. The reaction temperature is preferably in the range of 80°–100° C., and by adopting such mild conditions, polymer containing a large amount of dimer can be obtained. Removal of unreacted monomer is usually carried out by distilling off low-boiling point content.

Among 2,2,4-trimethyl-1,2-dihydroquinoline polymers usable in the present invention, those containing dimer, trimer and tetramer in a total amount of 75% by weight or more is preferred and those containing them in a total amount of 80% by weight or more is more preferred.

The amount of 2,2,4-trimethyl-1,2-dihydroquinoline polymers (C1) is in a range of 0.5–5 phr. If the amount is less than 0.5 phr, sufficient heat aging resistance cannot be obtained and if it exceeds 5 phr, adhesiveness is lowered.

The rubber composition (1) of the present invention exhibits synergistic effects in adhesiveness between rubber and a reinforcing material, particularly adhesiveness after degradation, anti-degradation properties such as heat aging resistance and flex cracking resistance of rubber, hardness, loss factor and dynamic modulus of elasticity of a rubber, compared to a rubber composition containing only (A) and (B1) or a rubber composition containing only (A) and (C1). By compounding (B1) and (C1) to a rubber (A), there can be attained low Mooney viscosity of an unvulcanized rubber which cannot be attained by a rubber composition containing only (A) and (B1) or a rubber composition containing only (A) and (C1). Due to the remarkably low Mooney viscosity of unvulcanized rubber composition (1), in processing steps such as the compounding step or the calendering step, the processing time can be shortened remarkably and the electrical consumption of processing machines can be reduced, hence, in the processing of rubber products, higher efficiency and reduction of energy consumption and resources consumption can be attained.

The cromane compounds (C2) are free from the fuming problems which occur during rubber processing when resorcin is used instead.

The cromane compound of formula (II) or (III) can be produced by allowing resorcin to react with acetone, diacetone alcohol or mesityl oxide in the presence of an acid catalyst. For example, the cromane compound can be obtained by subjecting 1 part by weight of resorcin to a condensation reaction with 1–20 parts by weight of acetone in the presence of 0.2–2 mol % of acid catalyst based on the resorcin at a temperature of 60°–80° C. for 4–20 hours. Examples of the acid catalyst used in the reaction include sulfuric acid, phosphoric acid, p-toluene sulfonic acid and hydrochloric acid. The reaction can be conducted either in the presence of solvent or in the absence of solvent. As preferred examples of the solvent, aliphatic alcohols such as methanol and ethanol, and aromatic hydrocarbon compounds such as toluene, xylene, ethylbenzene, cymene, chlorobenzene and nitrobenzene. By the reaction, usually, a mixture of the cromane compounds of formula (I) and (II) is obtained. Each of the cromane compounds of formula (I) and (II) can be obtained from the mixture, e.g. by liquid chromatography or recrystallization. The mixture as it is can also be used as the ingredient (C2) in rubber composition (2).

7,7'-Dihydroxy-4,4,4',4'-tetramethyl-2,2'-spirobicromane is a compound represented by the following formula:

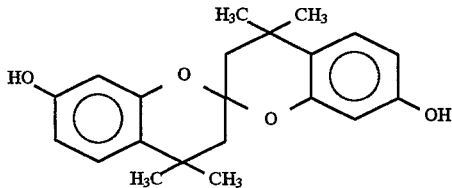

and can be produced according to a known method such as a method described in JP-A-62-111988. For example, it can be produced by allowing resorcin to react with acetone, diacetone alcohol or mesityl oxide in the presence of an aliphatic halogenated compound such as 1,2-dichloroethane and aqueous sulfuric acid solution.

The amount of cromane compound (C2) is in the range of 0.005–1 phr. If the amount is less than 0.005 phr, Sufficient improving effect cannot be obtained and even if it exceeds 1 phr, no more increase of the effects accompanied with the increase of amount cannot be expected, hence, it is economically disadvantageous. Preferably, the amount is in s range of 0.05–1 phr.

Choosing suitable conditions in condensation reaction of resorcin with acetone, diacetone alcohol or mesityl oxide, a mixture of 2,4,4-trimethyl-2',4',7-trihydroxyflavan (B2) and a cromane compound (C2) can be obtained. For example, such a mixture can be obtained by subjecting resorcin to a condensation reaction with 0.5–2 mol of acetone per mol of resorcin in the presence of 0.002–2 mol of acid catalyst per mol of resorcin, 1–3 parts by weight of an organic solvent immiscible with water, based on the weight of resorcin, and a seed crystal or water. Examples of the acid catalyst used in the reaction include sufuric acid, phosphoric acid, p-toluene sulfonic acid and hydrochloric acid. Examples of the solvent immiscible with water include aromatic hydrocarbon compounds such as toluene, o-xylene, m-xylene, p-xylene, mixed xylene, ethylbenzene, p-cymene and m-cymene, and halogenated aromatic hydrocarbon compounds such as chlorobenzene and o-dichlorobenzene.

When the reaction is conducted in the presence of water, the amount of water is preferably in the range of 0.1–1 part by weight per 1 part by weight of the acid catalyst. When the reaction is conducted in the presence of a seed crystal, its amount is preferably in the range of 0.0001–1 part by weight per 1 part by weight of the acid catalyst. As an example of the seed crystal, 2,4,4-trimethyl-2',4',7-trihydroxyflavan can be mentioned. The reaction temperature of the condensation reaction is not limited, but usually, it is in the range of about 30°–120° C. The higher the reaction temperature is, the higher the ratio of product (C2) to product (B2) is. For example, at a reaction temperature of 100° C. or higher, (C2) is produced predominantly.

Mixture of (B2) and (C2) thus obtained can be used for an additive to a rubber (A) as it is (=without modifying the components) or after modifying the components, if desired. Considering easiness of the step of compounding (B2) and (C2) to a rubber (A), i.e. in order to easily attain the ratio of the ingredients in the rubber composition (2) as mentioned above, it is preferred to modify the ratio of (B2) to (C2) in the mixture before compounding them to a rubber (A). The ratio of (B2) to (C2) is preferably 1:0.0005–2, more preferably 1:0.02–2. Modification of the ratio of the components can be conducted by adding to the mixture the component which is present in too small amount.

The rubber composition (2) of the present invention exhibits synergistic effects in adhesiveness between rubber and a reinforcing material, particularly a steel cord, hardness, loss factor and dynamic modulus of elasticity of a rubber, comparing to a rubber composition consisting only (A) and (B2).

The rubber composition (1) or (2) of present invention is very effective for a vulcanizing adhesion between a rubber and a reinforcing material, particularly a steel cord or an organic fiber. Examples of the steel cord adhered to the rubber include a brass-plated steel cord and a zinc-plated steel cord. Examples of the organic fiber include polyesters, nylons, rayons and aramides. Two or more kinds of reinforcing materials mentioned-above can be used together, although reinforcement can be attained by using one kind of reinforcing material.

The rubber composition (1) or (2) of present invention may further contain a methylene donor, if desired.

As the methylene donor, a condensation product of melamine, formaldehyde and methanol, and hexamethylenetetram ine are preferred. They are used singly or in combination. Examples of the condensation products of melamine, formaldehyde and methanol include hexakis (methoxymethyl)melamine, pentakis(methoxymethyl) methylol melamine and tetrakis(methoxymethyl)dimethylol melamine. Among them, hexakis(methoxymethyl)melamine or a mixture containing hexakis(methoxymethyl)melamine predominantly is preferred as a methylene donor. The amount of methylene donor is preferably in a range of 0.5–6 phr, more preferably in a range of about 1–4 phr. When the amount of methylene donor is less than 0.5 phr, adhesiveness and hardness of the rubber is not improved very effectively. On the other hand, if it exceeds 6 phr, elongation at break, and retention of tensile strength and tensile stress after heat degradation are lowered. Hence, exceeding 6 phr is not preferred.

The rubber composition (1) or (2) of present invention may further contain cobalt carbonate or an organic cobalt compound. The organic cobalt compound may be, for example, a cobalt salt of an organic acid or an organic cobalt complex. Examples of a cobalt salt of an organic acid include a cobalt salt of a fatty acid, preferably a fatty acid having 3–30 carbon atoms, more preferably a fatty acid having 4–20 carbon atoms; cobalt naphthenate; cobalt stearate; cobalt propionate; cobalt benzoate; cobalt p-hydroxybenzoate; cobalt salt of rhodinic acid; and a compound represented by the formula:

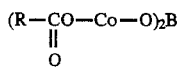

wherein R is an aliphatic group, preferably alkyl having up to 20 carbon atoms, more preferably alkyl having 6–14 carbon atoms (such as "MANOBOND C CP420" and "MANOBOND C 680C" manufactured by Manchem. Co., Ltd.). Examples of an organic cobalt complex include cobalt acetyl acetonate and acetylacetoanilide-cobalt complex. Among the cobalt carbonate or organic cobalt compound, cobalt carbonate (II) is preferably used. The organic cobalt compounds are preferably used in a rubber composition for coating a steel cord. The amount of the organic cobalt compound is preferably in a range of 0.05–1 phr calculated as the amount of cobalt. More than 1 phr is not preferred, because heat aging resistance and flex cracking resistance are lowered.

The rubber composition (1) or (2) of present invention may further contain a reinforcing agent and/or a filler, if necessary. Any reinforcing agents and fillers usually used in the rubber industry can be used in the rubber composition (1) or (2). For example, reinforcing agents such as carbon black and inorganic fillers such as silica, clay and calcium carbonate can be used. Among them, carbon black is preferably used in view of reinforcing ability, hardness of rubber, heat build-up and dynamic durability, particularly in view of hardness of rubber. Such kind of carbon black usually used in the rubber industry as SAF, ISAF, HAF, FEF, SRF, GPF, MT and the like can be used. The compounding amount of reinforcing agent and/or filler is preferably in a range of 20–150 phr, more preferably in a range of 40–80 phr. Hydrated silica is also preferably used in order to improve the adhesiveness with an organic fiber. Hydrated silica can be compounded together with carbon black or without carbon black. The amount of the hydrated silica to be compounded is preferably in a range of 5–40 phr.

The rubber composition (1) or (2) of present invention may further contain one or more kinds of various rubber chemicals which are usually used in the rubber industry, if desired. Examples of such rubber chemicals include antidegradants such as antioxidants and antiozonants, vulcanization agents, cross-linking agents, vulcanization accelerators, retarders, peptizers, processing aids, waxes, oils, stearic acid and tackifiers. The amount of the rubber chemicals varies depending on their aimed use, but is in a range in which the rubber chemicals are usually used in rubber industry.

Particularly, benzothiazole vulcanization accelerators such as 2-mercaptobenzothiazole, dibenzothiazyl disulfide, N-alkylsubstituted benzothiazyl sulfenamide, N-cycloalkylsubstituted benzothiazyl sulfenamide, N-alkylsubstituted benzothiazyl sulfenimide and N-cycloalkylsubstituted benzothiazylsulfenimide are preferably used, because improvement of the adhesiveness can be attained by vulcanizing rubber composition containing the same. Number of alkyl or cycloalkyl groups linked to N-position in the N-alkylsubstituted benzothiazyl sulfenamide may be one or two. When two alkyl groups are linked to the N-position, they may form a ring such as a morpholine ring together with the nitrogen atom to which they are linked. The alkyl group linked to the N-position may be a straight chain or branched chain alkyl. Examples of N-alkylsubstituted benzothiazyl sulfenamide include N-cyclohexyl-2-benzothiazyl sulfenamide, N-tert-butyl-2-benzothiazyl sulfenamide, N-amyl-2-benzothiazyl sulfenamide, N-oxydiethylene-2-benzothiazyl sulfenamide and N,N-dicyclohexyl-2-benzothiazyl sulfenamide. Examples of N-alkyl- or N-cycloalkylsubstituted benzothiazyl sulfenimide include N-tert-butyl-2-benzothiazyl sulfenimide and N-cyclohexyl-2-benzothiazyl sulfenimide. Among them, N-cyclohexyl-2-benzothiazyl sulfenamide, N-tert-butyl-2-benzothiazyl sulfenamide and N,N-dicyclohexyl-2-benzothiazyl sulfenamide are preferred in view of the improvement of hardness and adhesiveness. The compounding amount of the vulcanization accelerators, particularly benzothiazole vulcanization accelerators, is preferably in a range of 0.1–4 phr.

The rubber composition (1) or (2) of present invention usually contains a vulcanization agent, because it is usually used for a vulcanization adhesion to a reinforcing material. A preferred vulcanization agent is sulfur. Sulfur as a vulcanizing agent can be an insoluble sulfur or one of various soluble sulfurs which is usually used in the rubber industry. The amount of the sulfur compounded to the rubber composition is usually in a range of about 1–10 phr. When a steel cord is used as a reinforcing material, an insoluble sulfur is preferred in view of the improvement of the adhesiveness to a steel cord, and the amount is preferably about 4 to 10 phr.

The rubber composition (1) or (2) of present invention may further contain an antidegradant. Examples of the antidegradant include N-isopropyl-N'-phenyl-p-diaminobenzene, N-(1,3-dimethylbutyl)-N'-phenyl-p-diaminobenzene and N-N'-diaryl-p-di-aminobenzene. Wherein "aryl" includes, for instance, phenyl and phenyl substituted by $C_1$–$C_4$ alkyl. Rubber composition (2) may contain 2,2,4-trimethyl-1,2-dihy-droquinoline polymer as an antidegradant. The amount of the antidegradant is usually in a range of 0.1–4 phr.

The rubber composition (1) or (2) of present invention thus prepared exhibits excellent effects when it is applied to a portion of a tire or other rubber products, particularly to a portion to be reinforced with a reinforcing material such as a steel cord and an organic fiber. Tires are produced, for example, by applying the rubber composition (1) or (2) to a portion of a tire, particularly to a carcass portion, a belt portion or the like which is a portion of a tire to be reinforced with a reinforcing material and by conducting a molding and a vulcanization step according to conventional manners as usually conducted in tire industry to produce a tire.

In a vulcanization in contact with a reinforcing material, the optimum conditions may be adopted according to kind of the base rubber and kind of ingredients to be compounded to the rubber. Even when vulcanization is conducted without contacting a reinforcing material, a vulcanized rubber excellent in heat aging resistance, hardness and dynamic modulus of elasticity can be obtained. The vulcanization conditions per se may be those which have been heretofore been generally adopted and are not limited in this invention.

EXAMPLES

The present invention is explained in detail below referring to Examples, which should not be construed to limit the present invention. In the Examples, "%" and "part" for expressing an added amount and a content mean "% by weight" and "part by weight" respectively unless otherwise mentioned.

Synthesis example 1

Into a 500 ml four necked flask equipped with a thermometer, a condenser, a stirrer and an equipment for adding acetone, 121 g (1.3 mole) of aniline, 12.4 g (0.065 mole) of p-toluene sulfonic acid monohydrate were charged and heated. While keeping the inner temperature at 95°–100°C., 755 g of acetone was added over 8 hours. The reaction mixture was diluted with 100 ml of toluene and was neutralized with 2.6 g of sodium hydroxide and 50 ml of water while keeping the temperature at 85°–95° C., and was left stand as it is for a while to separate water phase and oil phase. After the water phase was removed, the oil phase was washed with 100 ml of water and same washing step was repeated several more times until the solution became neutral. Then, from the solution, toluene was removed by a phase separation and a distillation.

Then, the resulting solution was subjected to a precise fractional distillation under an reduced pressure and 20 g of unreacted aniline fraction was obtained by boiling point 100° C./10 mmHg and 142.4 g of monomer fraction was obtained between 100° C./10 mmHg and 90° C./2 mmHg. Purity of the monomer fraction was 97.0%.

Subsequently, into a four necked flask equipped with a thermometer, a condenser and a stirrer, 100 g of the monomer fraction obtained above, 20.9 g of conc. hydrochloric acid and 20 ml of water were charged, then heated to 90° C. and the temperature was kept at 90°–100° C. for 6 hours while stirring the mixture. Thereafter, the reaction product was diluted with 100 ml of toluene and was neutralized with 19.8 g of 45% aqueous sodium hydroxide solution while keeping the temperature at 85°–90° C., and was left stand as it is for a while to separate phases, and then water phase was removed. The toluene phase was washed with 100 ml of water and same washing step was repeated several more times. From the resulting solution, toluene was removed by a phase separation and a distillation. Then, the solution was subjected to a distillation until the distillation conditions reached to 200° C./2 mmHg to distill off 21.8 g of lower boiling point fraction and to obtain 73.2 g of 2,2,4-trimethyl-1,2-dihydroquinoline polymer as the remaining fraction, which is denoted as antidegradant D1, hereinafter. Ingredients of antidegradant D1 are shown in Table 1.

Synthesis example 2

Into a 500 ml four necked flask equipped with a thermometer, a condenser, a stirrer, an equipment for adding acetone, an equipment for separating off water which is connected to the top of condenser, 93.1 g (1 mole) of aniline, 27 g (0.27 mole) of conc. hydrochloric acid and 3 g of n-hexane were charged and heated. Some amount of n-hexane was previously put into the equipment for separating off water before starting the reaction. When inner temperature reached to 85° C., addition of acetone was started, and, while keeping the inner temperature at 70°–90° C., 174 g (3 mole) of acetone was added over 8 hours. Water produced in the condensation reaction was co-distilled off from the flask and introduced into the equipment for separating off water, in which water and n-hexane were separated into two phases. Thus, produced water was removed continuously from the reaction system. After completion of the addition of acetone, the reaction mixture was neutralized with 15 g of 28% aqueous sodium hydroxide solution and 100 ml of water while keeping the temperature at 60°–80° C., and was diluted with 100 ml of toluene. Then, the resulting reaction mixture was filtered by using G3 glass filter which was pre-coated with a filtration aid (commercial name "Radiorite") to remove catalyst residue. The filtrate was left to stand as it was for a while to separate water phase and oil phase. After the water phase was removed, the oil phase was washed with 100 ml of water and same washing step was repeated several more times until the solution became neutral. Then, from the solution, lower boiling point fraction such as n-hexane, toluene and unreacted acetone was removed by a distillation. Then, the resulting solution was subjected to a precise fractional distillation under an reduced pressure and 23 g of unreacted aniline fraction was obtained by boiling point 100 ° C./10 mmHg and 57.5 g (purity: 96.8%) of monomer fraction was obtained between 100° C./10 mmHg and 90° C. /2 mmHg and 82.6 g of 2,2,4-trimethyl-1,2-dihydroquinoline polymer was obtained, which is denoted as antidegradant S, hereinafter. Ingredients of antidegradant S are shown in Table 1.

Synthesis example 3

Synthesis example 1 was repeated except that amount of conc. hydrochloric acid and water which were charged with monomer fraction were changed from 20.9 g and 20 ml, respectively to 60.8 (0.6 mole) and 30 ml, respectively to obtain 80.5 g of 2,2,4-trimethyl-1,2-dihydroquinoline polymer. Amount of lower boiling point fraction distilled off was 14.5 g. 2,2,4-Trimethyl-1,2-dihydroquinoline polymer thus obtained is denoted as antidegradant T, hereinafter. Ingredients of antidegradant T are shown in Table 1.

Synthesis example 4

Synthesis example 1 was repeated except that the conditions of the precise fractional distillation under an reduced pressure was changed so that 14 g of unreacted aniline fraction was obtained by boiling point 100° C./20 mmHg and 148.6 g of monomer fraction was obtained between 100 ° C./20 mmHg and 90° C./2 mmHg. Purity of the monomer fraction was 84.2%. After the precise fractional distillation, same procedures as in Synthesis example 1 were repeated to obtain 71.6 g of 2,2,4-trimethyl-1,2-dihydroquinoline polymer. 2,2,4-Trimethyl-1,2-dihydroquinoline polymer thus obtained is denoted as antidegradant U, hereinafter. Ingredients of antidegradant U are shown in Table 1.

TABLE 1

| Ingredient | Antidegradant | | | |
|---|---|---|---|---|
| | D1 | S | T | U |
| Monomer (%) | 0.3 | 4.9 | 0.6 | 0.2 |
| Dimer (%) | 40.4 | 17.8 | 23.4 | 39.9 |
| Trimer (%) | 29.5 | 10.6 | 18.6 | 28.5 |
| Tetramer (%) | 15.4 | 7.2 | 11.2 | 15.1 |
| Primary Amine (%) | 0.4 | 2.3 | 0.7 | 1.7 |

Synthesis example 5

Into a 500 ml four necked flask equipped with a thermometer, a condenser and a stirrer, 199.9 g (1.8 mole) of resorcin, 210.9 g (3.6 mole) of acetone and 1.33 g (0.008 mole) of p-toluene sulfonic acid monohydrate were charged and heated. While keeping the inner temperature at 78°–82° C. for 4 hours, the reaction mixture was cooled to room temperature. After neutralize the reaction mixture with aqueous sodium hydroxide solution, acetone and water was distilled off under an reduced pressure of 20 mmHg at 60° C. Viscous liquid thus obtained were diluted with acetonitrile and aimed product was obtained through a fractionation by using a high speed liquid chromatography.

33.8 g of a cromane compound of formula (II) wherein m is 1 (hereinafter which is denoted as E1) and which contains diastereomers (hereinafter each of which is denoted as E1a or E1b, respectively) was obtained (yield based on resorcin is 11.5%), and 9.7 g of a cromane compound of formula (III) wherein n is 1 (hereinafter which is denoted as E2) was obtained (yield based on resorcin is 3.8%).

Mass spectrum and $^1$H NMR spectrum of E1a, E1b and E2 were measured and results are shown below. $^1$H NMR spectrum was measured by using GX-270 manufactured by Nippon Denshi Co., Ltd.

Mass spectrum (FD/MS) m/e:

E1a: 490

E1b: 490

E2 : 490

$^1$H NMR spectrum Chemical Shift ppm (solvent: acetone-d6, TMS)

E1a: 0.67 (s, 6H); 1.18 (s, 6H); 1.51 (s, 6H) 1.77 (d, J=14 Hz, 2H); 2.80 (d, J=14 Hz, 2H) 6.34 (s, 1H); 6.4–6.5 (multi, 4H) 7.00 (d, J=9 Hz, 2H); 7.15 (s, 1H) 8.20 (s, 1H); 8.39 (s, 1H)

E1b: 0.92 (s, 6H); 1.26 (s, 6H); 1.49 (s, 6H) 1.92 (d, J=14 Hz, 2H); 2.65 (d, J=14 Hz, 2H) 6.32 (s, 1H); 6.4–6.5 (multi, 4H) 7.03 (d, J=8 Hz, 2H); 7.21 (s, 1H) 8.17 (s, 1H); 8.37 (s, 1H)

E2: 0.63 (s, 3H); 0.75 (s, 3H); 1.10 (s, 3H) 1.21 (s, 3H); 1.48 (s, 3H); 1.52 (s, 3H) 1.73 (d, J=14 Hz, 1H); 1.79 (d, J=14 Hz, 1H) 2.75 (d, J=14 Hz, 1H); 2.83 (d, J=14 Hz, 1H) 6.4–6.5 (multi, 5H); 6.89 (d, J=8 Hz, 1H) 7.03 (d, J=9 Hz, 1H); 7.07 (d, J=8 Hz, 1H) 8.10 (s, 2H); 8.35 (s, 1H); 8.40 (s, 1H)

Synthesis example 6

After inner part of a 300 ml four necked flask equipped with a thermometer, a condenser and a stirrer was replaced with nitrogen gas, 86.1 g (0.78 mole) of resorcin, 49.8 g (0.86 mole) of acetone and 100.9 g of xylene were charged thereto and the inner temperature was elevated to 35° C. to completely dissolve resorcin. Subsequently, while keeping the temperature, 2.34 g of 2,4,4-trimethyl-2',4',7-trihydroxyflavan having purity of 98% and 1.48 g of p-toluene sulfonic acid monohydrate were added thereto and then, the inner temperature was elevated to 90° C. over 2 hours and the temperature was kept for two more hours. Then, reaction ratio of resorcin was 98%. After cooling to room temperature, the reaction mixture was neutralized with 30% aqueous sodium hydroxide solution, xylene, water etc. were distilled off under an reduced pressure of 50 mmHg at 100° C. to obtain 117.5 g of slightly yellowish powder crystal. Measuring the melting point of this crystal, starting point of melting is 187° C. and end point of melting is 234° C. Ingredients of this powder crystal are as follows.

| | |
|---|---|
| 2,4,4-trimethyl-2',4',7-trihydroxyflavan | 84.2% |
| Compound E1 | 4.5% |
| Compound E2 | 3.0% |
| 7,7'-dihydroxy-4,4,4',4'-tetramethyl-2,2'-spirocromane | 3.8% |
| resorcin | 0.9% |
| other ingredients | 3.6% |

In Examples and Comparative examples, following methylene acceptor, methylene donor and antidegradant are used, other than those mentioned above. They are denoted in Examples and Comparative examples by the symbols mentioned below.

E3 : 7,7'-dihydroxy-4,4,4',4'-tetramethyl-2,2'-spirobicromane

F1: 2,4,4-trimethyl-2'4'7-trihydroxyflavan

F2: 2,4,4-trimethyl-3-methyl-2'4'7-trihydroxyflavan

F3: 6-hydroxy-4a-(2,4-dihydroxyphenyl)-1,2,3,4.4a,9a-hexahydroxanthene-9-spiro-1'-cyclohexane X: resorcin Antidegradant V: N-(1,3-dimethylbutyl)-N'-phenyl-p-diaminobenzene

Examples 1–3

| <Compounding recipe> | |
|---|---|
| Natural rubber (SMR20) | 85 parts |
| Polyisoprene rubber (Nipol IR2200; manufactured by Nippon Zeon Co., Ltd.) | 15 parts |
| HAF carbon black (N330) | 60 parts |
| Stearic acid | 0.5 part |
| Zinc oxide | 8 parts |
| Methylene acceptor (B1): described in Table 2 | 1.5 parts |
| Antidegradant (C1): described in Table 2 | 2 parts |
| Manobond C 680C | 1 part |
| Vulcanization accelerator (N,N-dicyclohexyl-2-benzothiazyl sulfenamide) | 0.8 part |
| Insoluble Sulfur | 5 parts |
| Methoxylated methylolmelamine resin (Cyrez 966 manufactuyed by American Cyanamid Chemical Co., Ltd.) | 1.5 parts |
| Retarder (Santgard PVI manufactured by Monsant Co., Ltd.) | 0.2 parts |

A 1.8 liter Banbury mixer was used and the natural rubber, polyisoprene rubber, carbon black, stearic acid, zinc oxide, methylene acceptor, antidegradant and Manobond C 680C were added thereto according to the above compounding recipe as adjusting the initial temperature at 80° C., and they were kneaded for 3 minutes and then discharged. Rubber temperature at the discharge was 145°–155° C.

Subsequently, the compounded rubber composition was charged to the Banbury mixer, then the vulcanization accelerator, insoluble sulfur, methoxylated methylolmelamine resin and the retarder were added thereto according to the above compounding recipe, and the resulting composition was kneaded for 1.5 minutes while maintaining temperature of the rubber in the mixer is 100° C. or lower.

Then, the kneaded unvulcanized rubber composition was discharged from the mixer and transferred to an open mill, then extruded to form a sheet at a rubber temperature of 80°–100 ° C. And the sheet thus obtained was left as it was for 2 days at room temperature.

Thereafter, from the sheet of unvulcanized rubber, test pieces for Mooney viscosity test and Mooney scorch test were prepared. Into the remaining sheet, a brass plated steel cord was buried and the resulting sheet was vulcanized at 150° C. for 30 minutes by using a vulcanizing press to prepare test pieces for adhesiveness tests. From the remaining sheet, test pieces for tensile property tests, heat-degradation tests, flex cracking property test, tear strength tests, hardness tests and dynamic viscoelasticity test were prepared and they are vulcanized at 150° C. for 30 minutes. The tests were conducted according to methods mentioned below and results were shown in Table 2–3.

Mooney viscosity test

According to JIS K 6300, after the test pieces was pre-heated for one minute at a test temperature of 100° C., by using L type rotor, the rotor was rotated for 4 minutes at the test temperature to measure Mooney viscosity. The lower is the Mooney viscosity, the less is energy consumption in processing steps. Therefore, lower Mooney viscosity indicates superior processability.

Mooney scorch test

According to JIS K 6300, after the test pieces was pre-heated for one minute at a test temperature of 135° C., by using L type rotor, the rotor was rotated at the test temperature to measure minimum Mooney viscosity (Vm) and Mooney scorch time ($t_5$). Lower minimum Mooney viscosity (Vm) indicates superior processability in processing steps. Longer Mooney scorch time indicates that unvulcanized rubber is more difficult to scorch, i.e. superior storage stability of unvalcanized rubber and superior processability.

Adhesiveness test

The test pieces, rubber compound before vulcanization, were brought to contact with brass-plated steel cords and were vulcanized. Then, the adhesiveness was evaluated according to the pulling-out test described in ASTM D 2229. The adhesiveness tests were conducted before and after they were subjected to heat-humid degradation for 10 days at a temperature of 83° C., relative humidity of 98%. The result was indicated by the average value of the results obtained from 12 test pieces.

Tensile property test

According to JIS K 6301, using dumbbell No. 3 test pieces, tensile strength and elongation at break were measured. Larger tensile strength or elongation at break indicates superior tensile property.

Heat degradation test

According to JIS K6301, using dumbbell No. 3 test pieces, tensile strength and elongation at break were measured before and after the rubber compositions were subjected to heat degradation for 48 hours at 100° C., and comparing the results, retention of tensile strength and elongation at break against the heat degradation were calculated. Higher retention indicates superior heat degradation resistance.

Flex cracking property test

According to JIB K 6301, flex cracking property tests were conducted. At the center of hollow of the test piece, a hole having an original length of 2.03 mm was made vertically. Then, by using a re Mattia Tester manufactured by Ueshima Seisakusho Co., Ltd., length of crack caused after bending the test piece 8000 times was measured. Smaller length of the crack indicates superior flex cracking resistance.

Tear strength test

According to JIS K 6301, Tear strength was measured by using B type test pieces.

Hardness test

According to JIS K 6301, using a right cylinder-shared sample having a thickness of 12.7 mm, hardness was measured by a spring type hardness tester (A type). Higher hardness indicates superior toughening effect.

Dynamic viscoelasticity test

As a dynamic viscoelasticity tester, a viscoelasticity spectrometer F-III, manufactured by Iwamoto Seisakusho Co., Ltd., was used and dynamic modulus of elasticity (E') and loss factor (tan δ) were measured at the initial (statistic) strain of 2%, the amplitude of dynamic strain of 0.5%, the frequency of 10 Hz and the temperature of 60° C. The larger value of dynamic modulus of elasticity (E') indicates a superior toughening effect and the smaller value of loss factor (tan δ) indicates a smaller heat built-up and a superior blowout resistance.

TABLE 2

Results in Example 1–3

| Exp. No. | Methylene acceptor (B1) ↓ | Antidegra- dant (C1) ↓ | Mooney viscosity (100° C.) | Mooney scorch property | | Adhesiveness | |
|---|---|---|---|---|---|---|---|
| | | | | Minimum Mooney viscosity (Vm) | Scorch time $t_5$ (minute) | before heat degradation (N) | after heat degradation (N) |
| 1 | F1 | D1 | 46.8 | 23.7 | 21.8 | 301.8 | 262.7 |
| 2 | F2 | D1 | 46.9 | 24.0 | 22.0 | 298.0 | 259.1 |
| 3 | F3 | D1 | 47.1 | 23.9 | 21.5 | 297.0 | 257.5 |

TABLE 3

Results in Example 1–3

| | Tensile Properties | | Heat resistance | | Flex cracking | | | | Dynamic Viscoelasticity | |
|---|---|---|---|---|---|---|---|---|---|---|
| | Tensile | Elonga-tion | Tensile Strength | Elongation at break. | property test | Tear Strength | Hard- | | | |
| Exp. No. | Strength (MPa) | at break (%) | retention (%) | retention (%) | (mm) ↓ | (× 10³ N/m) | ness ↓ | | (E') (MPa) | loss factor |
| 1 | 24.8 | 360 | 56.4 | 41.4 | 6.8 | 63.2 | 80 | | 38.4 | 0.090 |
| 2 | 24.7 | 360 | 55.7 | 40.5 | 6.8 | 64.2 | 80 | | 37.9 | 0.091 |
| 3 | 24.7 | 360 | 55.4 | 40.0 | 6.7 | 64.0 | 79 | | 37.0 | 0.092 |

Comparative Example 1

Example 1 was repeated except that methylene acceptor (F1: 2,4,4-trimethyl-2',4',7-trihydroxyflavan) and antidegradant (D1: 2,2,4-trimethyl-1,2-dihydroquinoline polymer) were not used. The results are shown in Table 4–7.

Comparative Example 2–4

Example 1 was repeated except that methylene acceptor (F1: 2,4,4-trimethyl-2',4',7-trihydroxyflavan) or antidegradant (D1: 2,2,4-trimethyl-1,2-dihydroquinoline polymer) was not used. The results are shown in Table 4–7.

Comparative Example 5

Example 1 was repeated except that 2,4,4-trimethyl-2',4',7-trihydroxyflavan (F1) was replaced with resorcin (X). The results are shown in Table 4–7.

Comparative Example 6–9

Example 1 was repeated except that antidegradant (D1: 2,2,4-trimethyl-1,2-dihydroquinoline polymer) was replaced with antidegradant (S), (T), (U) or (V). The results are shown in Table 4–7.

Comparative Example 10–13

Example 1 was repeated except that 2,4,4-trimethyl-2',4', 7-trihydroxyflavan (F1) was replaced with (F2) and antidegradant (D1: 2,2,4-trimethyl-1,2-dihydroquinoline polymer) was replaced with antidegradant (S), (T), (U) or (V). The results are shown in Table 4–7.

Comparative Example 14–17

Example 1 was repeated except that 2,4,4-trimethyl-2',4', 7-trihydroxyflavan (F1) was replaced with resorcin (X) and antidegradant (D1: 2,2,4-trimethyl-1,2-dihydroquinoline polymer) was replaced with antidegradant (S), (T), (U) or (V). The results are shown in Table 4–7.

TABLE 4

Results in Comparative example 1–9

| | | | | Mooney scorch property | | Adhesiveness | |
|---|---|---|---|---|---|---|---|
| Comp. Exp. No. | Methylene acceptor (B1) ↓ | Antidegra-dant (C1) ↓ | Mooney viscosity (100° C.) | Minimum Mooney viscosity (Vm) | Scorch time t₅ (minute) | before heat degradation (N) | after heat degradation (N) |
| 1 | — | — | 47.3 | 24.0 | 19.9 | 285.0 | 195.0 |
| 2 | F1 | — | 48.5 | 25.8 | 22.0 | 298.5 | 222.6 |
| 3 | F2 | — | 48.7 | 25.9 | 22.1 | 297.1 | 215.0 |
| 4 | — | D1 | 50.9 | 26.8 | 17.9 | 280.1 | 199.8 |
| 5 | X | D1 | 59.6 | 28.6 | 14.4 | 295.0 | 245.1 |
| 6 | F1 | S | 58.2 | 28.4 | 16.0 | 289.0 | 220.5 |
| 7 | F1 | T | 49.1 | 25.9 | 21.5 | 297.4 | 233.6 |
| 8 | F1 | U | 57.0 | 28.3 | 16.7 | 290.1 | 241.0 |
| 9 | F1 | V | 56.4 | 27.7 | 17.3 | 288.65 | 237.1 |

TABLE 5

Results in Comparative example 1-9

| Comp. Exp. No. | Tensile Properties | | Heat resistance | | Flex cracking property test (mm) ↓ | Tear Strength N/m | Hard- ness ↓ | Dynamic Viscoelasticity | |
|---|---|---|---|---|---|---|---|---|---|
| | Tensile Strength (MPa) | Elonga- tion (%) | Tensile Strength (%) | Elongation at break. (%) | | | | (E') (MPa) | loss factor |
| 1 | 25.1 | 390 | 15.6 | 10.1 | 13.4 | 47.7 | 72 | 19.8 | 0.120 |
| 2 | 22.0 | 340 | 14.1 | 8.5 | 14.7 | 55.9 | 79 | 35.1 | 0.095 |
| 3 | 21.8 | 330 | 13.6 | 7.7 | 14.3 | 54.6 | 78 | 34.4 | 0.096 |
| 4 | 25.0 | 390 | 57.0 | 42.2 | 6.2 | 47.8 | 72 | 20.1 | 0.124 |
| 5 | 21.2 | 310 | 53.8 | 39.7 | 7.7 | 63.7 | 78 | 34.3 | 0.093 |
| 6 | 24.0 | 330 | 36.7 | 25.5 | 10.8 | 57.1 | 78 | 34.7 | 0.096 |
| 7 | 24.2 | 340 | 40.4 | 34.1 | 9.0 | 58.9 | 78 | 34.8 | 0.095 |
| 8 | 24.5 | 350 | 49.9 | 36.7 | 8.1 | 59.8 | 79 | 35.8 | 0.094 |
| 9 | 24.0 | 350 | 44.4 | 35.3 | 8.5 | 59.4 | 79 | 35.9 | 0.095 |

TABLE 6

Results in Comparative example 10-17

| Exp. No. | Methylene acceptor (B1) ↓ | Antidegra- dant (C1) ↓ | Mooney viscosity (100° C.) | Mooney scorch property | | Adhesiveness | |
|---|---|---|---|---|---|---|---|
| | | | | Minimum Mooney viscosity (Vm) | Scorch time $t_5$ (minute) | before heat degradation (N) | after heat degradation (N) |
| 10 | F2 | S | 58.4 | 28.3 | 16.3 | 288.1 | 219.7 |
| 11 | F2 | T | 49.3 | 25.6 | 21.4 | 296.5 | 233.1 |
| 12 | F2 | U | 57.0 | 28.5 | 16.9 | 290.0 | 241.2 |
| 13 | F2 | V | 56.1 | 27.5 | 17.2 | 287.8 | 236.7 |
| 14 | X | S | 63.7 | 30.2 | 12.1 | 285.1 | 209.1 |
| 15 | X | T | 59.9 | 28.8 | 14.1 | 293.1 | 230.0 |
| 16 | X | U | 62.4 | 30.0 | 12.5 | 294.4 | 241.1 |
| 17 | X | V | 60.0 | 29.9 | 13.4 | 291.1 | 240.3 |

TABLE 7

Results in Comparative example 10-17

| Comp. Exp. No. | Tensile Properties | | Heat resistance | | Flex cracking property test (mm) ↓ | Tear Strength N/m | Hard- ness ↓ | Dynamic Viscoelasticity | |
|---|---|---|---|---|---|---|---|---|---|
| | Tensile Strength (MPa) | Elonga- tion (%) | Tensile Strength (%) | Elongation at break. (%) | | | | (E') (MPa) | loss factor |
| 10 | 24.1 | 330 | 36.6 | 25.3 | 10.9 | 56.8 | 78 | 34.2 | 0.097 |
| 11 | 24.0 | 330 | 40.5 | 34.0 | 9.2 | 58.4 | 78 | 34.6 | 0.096 |
| 12 | 24.3 | 340 | 49.4 | 36.8 | 8.3 | 59.5 | 78 | 35.5 | 0.095 |
| 13 | 23.8 | 350 | 44.1 | 35.1 | 8.6 | 59.2 | 78 | 35.4 | 0.097 |
| 14 | 20.8 | 290 | 34.4 | 21.6 | 11.0 | 57.5 | 78 | 32.1 | 0.098 |
| 15 | 20.9 | 300 | 35.4 | 31.5 | 9.2 | 58.6 | 78 | 32.8 | 0.097 |
| 16 | 21.1 | 310 | 39.7 | 32.6 | 8.4 | 58.0 | 78 | 32.4 | 0.096 |
| 17 | 21.3 | 310 | 40.7 | 31.8 | 8.8 | 59.3 | 78 | 32.6 | 0.096 |

The rubber composition (1) of the present invention gives excellent processability and improved adhesiviness of the vulcanized rubber and a reinforcing material after vulcanization adhesion. Particularly, it exhibits low decrease in the adhesiveness after degradation. The vulcanized rubber obtained from it not only exhibits high heat aging resistance, high flex cracking resistance, high hardness and toughness but also, in a dynamic transformation, exhibits high modulus of elasticity and small loss factor which indicate excellent toughening effects in a dynamic state. Accordingly, applying the rubber composition to a material to be reinforced with a Examples 4-9

| <Compound recipe> | |
|---|---|
| Natural rubber (RSS#1) | 85 parts |
| Polysioprene rubber (Nipol IR2200; manufactured by Nippon Zeon Co., Ltd.) | 15 parts |
| HAF carbon black (N330) | 60 parts |
| Stearic acid | 1 part |
| Zinc oxide | 8 parts |
| Ingredient (B2) described in Table 6 | |
| Ingredient (C2) described in Table 6 | |
| Antidegradant (N-(1,3-dimethylbutyl)-N'-phenyl p-diaminobenzene) | 3 parts |
| Cobalt napthenate (cobalt content 1.1%) | 2 parts |
| Vulcanization accelerator (N,N-dicyclohexyl-2-benzothiazyl sulfenamide) | 0.8 part |
| Insoluble Sulfur | 5 parts |
| Methoxylated methylolmelamine resin (Cyrez 966 manufactured by American Cyanamid Chemical Co., Ltd.) | 1.5 parts |
| Retarder (Santgard PVI manufactured by Monsant Co., Ltd.) | 0.2 parts |

A 1.8 liter Banbury mixer was used and the natural rubber, polyisoprene rubber, carbon black, stearic acid, zinc oxide, the ingredient (B2), (C2), antidegradant and Cobalt naphthenate were added thereto according to the above compounding recipe as adjusting the initial temperature at 80° C., and they were kneaded for 3 minutes and then discharged. Rubber temperature at the discharge was 145°–155° C.

Subsequently, the compounded rubber composition was charged to the Banbury mixer, then the vulcanization accelerator, insoluble sulfur, methoxylated methylolmelamine resin and the retarder were added thereto according to the above compounding recipe, and the resulting composition was kneaded for 1.5 minutes while maintaining temperature of the rubber in the mixer is 100° C. or lower.

Then, the kneaded unvulcanized rubber composition was discharged from the mixer and transferred to an open mill, then extruded to form a sheet at a rubber temperature of 80°–100° C.

Thereafter, into a part of the sheet of unvulcanized rubber thus obtained, a brass plated steel cord was buried and the resulting sheet was vulcanized at 150° C. for 30 minutes by using a vulcanizing press to prepare test pieces for adhesiveness tests. From the remaining sheet, test pieces for tensile property tests, hardness tests and dynamic viscoelasticity test were prepared and they are vulcanized at 150° C. for 30 minutes. The tensile property tests, hardness tests and dynamic viscoelasticity tests were conducted according to methods mentioned above, and the adhesiveness tests were conducted according to methods mentioned below. Results were shown in Table 8

Adhesiveness test

The test pieces, rubber compound before vulcanization, were brought to contact with brass-plated steel cords and were vulcanized. Then, the adhesiveness was evaluated according to the pulling-out test described in ASTM D 2229. The result was indicated by the average value of the results obtained from 12 test pieces.

TABLE 8

Results in Example 4-9

| Exp. No. | Ingredient (B2) (amount phr) ↓ | Ingredient (C2) (amount phr) ↓ | Adhesiveness (N) | Tensile Strength (MPa) | Elongation at break (%) | Hardness ↓ | Dynamic Viscoelasticity (E') (MPa) | loss factor |
|---|---|---|---|---|---|---|---|---|
| 4 | F1(1.43) | E1(0.07) | 311.1 | 24.6 | 370 | 82 | 39.1 | 0.089 |
| 5 | F1(1.35) | E1(0.15) | 312.0 | 24.5 | 370 | 82 | 38.7 | 0.090 |
| 6 | F1(1.43) | E2(0.07) | 310.0 | 24.4 | 360 | 81 | 36.9 | 0.091 |
| 7 | F1(1.43) | E3(0.07) | 311.2 | 24.6 | 370 | 82 | 39.1 | 0.089 |
| 8 | F1(1.35) | E3(0.15) | 311.8 | 24.4 | 360 | 82 | 38.9 | 0.090 |
| 9 | F1(0.5) | E3(1.0) | 312.1 | 23.8 | 360 | 83 | 39.5 | 0.089 |

Comparative Example 18

Example 4 was repeated except that the ingredient (B2) and (C2) were not used. The results are shown in Table 9.

Comparative Example 19

Example 4 was repeated except that the ingredient (C2) was not used. The results are shown in Table 9.

Comparative Example 20

Example 4 was repeated except that the ingredient (B2), i.e. 2,4,4-trimethyl-2',4',7-trihydroxyflavan (F1) was replaced with resorcin (X) and the ingredient (C2) was not used. The results are shown in Table 9.

TABLE 9

Results in Comparative example 19–20

| Comp. Exp. No. | Ingredient (B2) (amount phr) ↓ | Ingredient (C2) (amount phr) ↓ | Adhesiveness (N) | Tensile Properties Tensile Strength (MPa) | Elongation at break (%) | Hardness ↓ | Dynamic Viscoelasticity (E') (MPa) | loss factor |
|---|---|---|---|---|---|---|---|---|
| 18 | — | — | 279.5 | 25.5 | 400 | 70 | 17.5 | 0.122 |
| 19 | B (1.5) | — | 301.1 | 23.8 | 340 | 78 | 34.7 | 0.096 |
| 20 | X (1.5) | — | 293.8 | 20.8 | 310 | 77 | 31.1 | 0.098 |

The rubber composition (2) of the present invention gives excellent adhesiveness of the vulcanized rubber and a reinforcing material after vulcanization adhesion, and the vulcanized rubber obtained from it not only exhibits high high hardness and toughness but also, in a dynamic transformation, exhibits high modulus of elasticity and small loss factor which indicate excellent toughening effects in a dynamic state. Accordingly, applying the rubber composition to a material to be reinforced with a reinforcing material and conducting a vulcanization adhesion, a rubber product having high qualities can be obtained. Using additives of the present invention and cromane compounds of the present invention, the rubber composition (2) of the present invention having above mentioned excellent properties can be obtained.

What we claim is:

1. A rubber composition (1) which comprises:

100 parts by weight of a rubber (A) selected from natural rubber, styrene-butadiene copolymer rubber, butadiene rubber, isoprene rubber, acrylonitrile-butadiene copolymer rubber, chloroprene rubber, butyl rubber and halogenated butyl rubber;

0.5 part or more by weight of a hydroxy flavan compound (B1) represented by the formula (I):

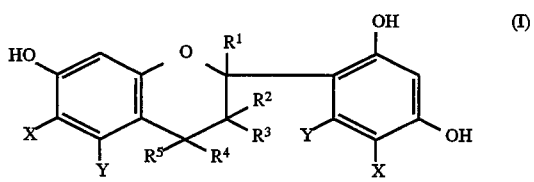

wherein $R^1$, $R^2$, $R^3$, $R^4$ and $R^5$, which may be the same or different, each represent hydrogen or an aliphatic group having 1–6 carbon atoms, or $R^1$ and $R^2$ together with the carbon atoms to which they are attached form an alicyclic ring having 4–10 carbon atoms, or $R^4$ and $R^5$ together with the carbon atom to which they are attached form an alicyclic ring having 4–10 carbon atoms, and X and Y, which may be the same or different, each represent a hydrogen atom, a hydroxy group or an aliphatic group having 1–8 carbon atoms; and 0.5–5 parts by weight of a 2,2,4-trimethyl-1,2-dihydroquinoline polymer (C1) comprising 1% or less by weight of a primary amine, 3% or less by weight of the monomer and 30% or more by weight of the dimer based on the total weight of the polymer.

2. A rubber composition according to claim 1 wherein X and Y are hydrogen.

3. A rubber composition according to claim 1 wherein the hydroxy flavan compound (B1) is 2,4,4-trimethyl-2',4',7-trihydroxyflavan.

4. A rubber composition according to claim 1 wherein the 2,2,4-trimethyl-1,2-dihydroquinoline polymer comprises dimer, trimer and tetramer in a total amount of 75% by weight or more.

5. A rubber composition according to claim 1 which further comprises a methylene donor in an amount of 0.5–6 parts by weight per 100 parts by weight of the rubber (A).

6. A rubber composition according to claim 1 which further comprises cobalt carbonate or an organic cobalt compound in an amount of 0.05–1 parts by weight calculated as the amount of cobalt per 100 parts by weight of the rubber (A).

7. A rubber composition according to claim 1 which further comprises a vulcanization accelerator selected from 2-mercaptobenzothiazole, dibenzothiazyl disulfide, N-alkylsubstituted benzothiazyl sulfenamide, N-cycloalkylsubstituted benzothiazyl sulfenamide, N-alkylsubstituted benzothiazyl sulfenimide and N-cycloalkylsubstituted benzothiazylsulfenimide.

8. A rubber composition according to claim 7 wherein the vulcanization accelerator is selected from N-cyclohexyl-2-benzothiazyl sulfenamide, N-tert-butyl-2-benzothiazyl sulfenamide and N,N-dicyclohexyl-2-benzothiazyl sulfenamide.

9. A rubber composition according to claim 1 which further comprises an antidegradant selected from N-isopropyl-N'-phenyl-p-diaminobenzene, N-(1,3-dimethylbutyl)-N'-phenyl-p-diaminobenzene and N,N'-diaryl-p-diaminobenzene in an amount of 0.1–4 parts by weight per 100 parts by weight of the rubber (A).

10. A vulcanization adhesion process which comprises compounding 0.5 part or more by weight of a hydroxy flavan compound (B1) represented by the formula (I):

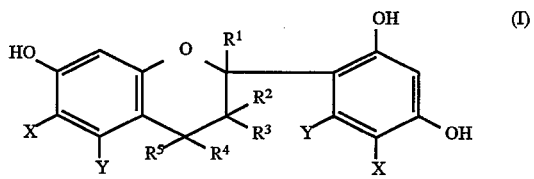

wherein $R^1$, $R^2$, $R^3$, $R^4$ and $R^5$, which may be the same or different, each represent hydrogen or an aliphatic group having 1–6 carbon atoms, or $R^1$ and $R^2$ together with the carbon atoms to which they are attached form an alicyclic ring having 4–10 carbon atoms, or $R^4$ and $R^5$ together with the carbon atom to which they are attached form an alicyclic ring having 4–10 carbon atoms, and X and Y, which may be the same or different, each represent a hydrogen atom, a hydroxy group or an aliphatic group having 1–8 carbon atoms; and 0.5–5 parts by weight of a 2,2,4-trimethyl-1,2-dihydroquinoline polymer (C1) containing 1% or less by weight of a primary amine, 3% or less by weight of the monomer and 30% or more by weight of the dimer based on total amount of the polymer; to 100 parts by weight of a rubber (A) selected from natural rubber, styrene-butadiene copolymer rubber, butadiene rubber, isoprene rubber, acrylonitrile-butadiene copolymer rubber, chloroprene rubber, butyl rubber and halogenated butyl rubber; and vulcanizing the resulting composition while contacting it with a reinforcing material.

11. A vulcanization adhesion process according to claim 10 wherein the reinforcing material is a brass-plated steel cord, a zinc-plated steel cord, a polyester fiber, a nylon fiber, a rayon fiber or an aramide fiber.

12. A shared article which comprises a vulcanized rubber prepared by a process according to claim 10.

13. A tire which comprises a vulcanized rubber prepared by a process according to claim 10.

* * * * *